(12) United States Patent
Tian

(10) Patent No.: US 10,000,407 B2
(45) Date of Patent: Jun. 19, 2018

(54) VACUUM PLATE AND METHOD FOR MANUFACTURING THE SAME

(71) Applicant: Icesun Vacuum Glass Ltd., Montague (CA)

(72) Inventor: Yongjiang Tian, Charlottetown (CA)

(73) Assignee: ICESUN VACUUM GLASS LTD., Montague, PE (CA)

( * ) Notice: Subject to any disclaimer, the term of this patent is extended or adjusted under 35 U.S.C. 154(b) by 0 days. days.

(21) Appl. No.: 14/431,971

(22) PCT Filed: Oct. 30, 2014

(86) PCT No.: PCT/CN2014/089950
§ 371 (c)(1),
(2) Date: Mar. 27, 2015

(87) PCT Pub. No.: WO2016/061839
PCT Pub. Date: Apr. 28, 2016

(65) Prior Publication Data
US 2017/0217816 A1    Aug. 3, 2017

(30) Foreign Application Priority Data

Oct. 20, 2014   (CN) .......................... 2014 1 0558660
Oct. 20, 2014   (CN) ..................... 2014 2 0607158 U

(51) Int. Cl.
*E06B 3/66*    (2006.01)
*C03B 23/24*   (2006.01)
(Continued)

(52) U.S. Cl.
CPC ............ *C03B 23/24* (2013.01); *E06B 3/6612* (2013.01); *E06B 3/66304* (2013.01); *E06B 3/67* (2013.01);
(Continued)

(58) Field of Classification Search
CPC .. E06B 3/6612; E06B 3/66304; E06B 3/6736; E06B 3/6775; Y02B 80/24; Y10T 428/231; Y10Y 428/239; Y10Y 428/24711
See application file for complete search history.

(56) References Cited

U.S. PATENT DOCUMENTS 5,891,536 A *   4/1999   Collins ............. B32B 17/10055
                                                       428/120
6,172,454 B1*   1/2001   Hofmann ................ H01J 9/185
                                                        313/292
(Continued)

FOREIGN PATENT DOCUMENTS

CN          102730950 A       10/2012
CN          102777115 A       11/2012
(Continued)

OTHER PUBLICATIONS

Office Action dated Jul. 19, 2016 issued in related Canadian Patent Application No. 2,888,398.
(Continued)

*Primary Examiner* — Donald J Loney

(57) ABSTRACT

The present invention discloses a vacuum plate and a method for manufacturing it. The vacuum plate comprises at least two layers of plate, a plurality of support structures with different heights, and an organic film. The plates in adjacent layers are separated by a plurality of the support structures with different heights, peripheries of the at least two layers of plate are connected and sealed via a sealing mixture; and the peripheries of the at least two layers of plate and the outside of the sealing mixture are covered with the organic film. According to surface undulation of the plate, the supporting structures with corresponding heights are arranged on corresponding positions between the layers of plate, and the heights of the support structures match with (Continued)

the spacings at corresponding positions in the vacuum plate, so that each support structure can be clamped by the upper and the lower plate layers, and effectively plays a supporting role, thereby reducing the security risk from damage of the vacuum plate.

18 Claims, 5 Drawing Sheets

(51) Int. Cl.
  *E06B 3/67* (2006.01)
  *E06B 3/663* (2006.01)
  *E06B 3/673* (2006.01)
  *E06B 3/677* (2006.01)
(52) U.S. Cl.
  CPC .......... *E06B 3/6736* (2013.01); *E06B 3/6775* (2013.01); *Y02B 80/24* (2013.01); *Y10T 428/231* (2015.01); *Y10T 428/239* (2015.01); *Y10T 428/24711* (2015.01)

(56) References Cited

U.S. PATENT DOCUMENTS

| | | | | |
|---|---|---|---|---|
| 6,793,990 | B1* | 9/2004 | Sakaguchi | E06B 3/6612 156/109 |
| 7,115,308 | B2* | 10/2006 | Amari | C03C 27/06 156/104 |
| 7,989,040 | B2* | 8/2011 | Stark | E06B 3/6604 156/109 |
| 2013/0302542 | A1* | 11/2013 | Jones | E06B 3/6612 428/34 |

FOREIGN PATENT DOCUMENTS

| | | |
|---|---|---|
| CN | 102898007 A | 1/2013 |
| DE | 10034764 A1 | 12/2001 |
| KR | 20080038676 A | 5/2008 |

OTHER PUBLICATIONS

International Search Report and Written Opinion in PCT/CN2014/089950 dated Jul. 24, 2015.

* cited by examiner

VACUUM PLATE AND METHOD FOR MANUFACTURING THE SAME

CROSS-REFERENCE TO RELATED APPLICATION

This application is a U.S. national stage application based on International PCT Application No. PCT/CN2014/089950, filed on Oct. 30, 2014, entitled "VACUUM PLATE AND METHOD FOR MANUFACTURING THE SAME", which claims priority and the benefits of Chinese Patent Application Nos. CN201410558660.1 and CN201420607158.0, both filed Oct. 20, 2014, the entire contents of each of which are incorporated herein by reference.

FIELD OF THE TECHNOLOGY

The present invention relates to the field of plate material, and in particular, to a vacuum plate and a method for manufacturing the same.

BACKGROUND

With the rapid development of architectural decoration and other plate material industries, various vacuum plates with multiple functions have been produced for meeting different market demands, especially the vacuum plates with heat insulation, sound insulation, heat preservation, cold preservation and other functions have been widely used.

In the prior art, a method for manufacturing a multiple function vacuum plate generally includes steps of providing soldering glass at peripheries of the plates, arranging a number of support pillars on one of the plates, placing two plates together to allow them to move together, heating and melting the soldering glass provided at the peripheries of the plates to fix the two plates onto the support pillars, then cooling the soldering glass to seal and solidify the peripheries, and then vacuumizing the interspace between the plates via a pipe passed through one of the plates or a pipe with a sealed periphery by one of the plates, and finally melting the pipe to seal the plate, to form the vacuum plate.

In the vacuum plates of prior art, the same support structures are used among different plate layers to support the plates. Surfaces of the plates are generally not absolutely flat, causing that some support structures between the plates can support the plates, and thus most of support structures cannot support the plates, that is, they cannot effectively play a supporting role, and thereby the vacuum plate is easy to be damaged, bringing about potential security problems.

SUMMARY

The present invention provides a vacuum plate and a method for manufacturing the vacuum plate, to overcome the above problems of the prior art.

The present invention provides a vacuum plate comprising: at least two layers of plate, a plurality of support structures with different heights, and an organic film;

the plates in adjacent layers are separated by a plurality of the support structures with different heights;

peripheries of the at least two layers of plate are connected and sealed via a sealing mixture; and the peripheries of the at least two layers of plate and the outside of the sealing mixture are covered with the organic film.

The present invention provides a method for manufacturing a vacuum plate, comprising the following steps:

stacking and aligning a first plate and a second plate, and measuring intervals between the first and the second plates at support positions where support structures are to be placed, wherein an interval between two adjacent support structures is in the range of 10 mm to 120 mm;

separating the first plate and the second plate, and placing the support structures with corresponding height on the support positions of the first plate;

providing a sealing mixture on the upper surface rim of the first plate;

covering the first plate with the second plate to form a vacuum plate assembly with a cavity;

melting a substrate of the sealing mixture at a temperature of equal to or less than 700° C., to make the cavity form an air-tight vacuum space;

covering rims of the first and the second plates and the outside of the sealing mixture with an organic film and thus forming the vacuum plate.

In the vacuum plate and the method for manufacturing the vacuum plate according to the present invention, according to surface undulation of the plate, the supporting structures with corresponding heights are arranged on corresponding positions between the layers of plate, and the heights of the support structures match with the spacings at corresponding positions in the vacuum plate, so that each support structure can be clamped by the upper and the lower plate layers, and effectively plays a supporting role, thereby reducing the security risk from damage of the vacuum plate.

BRIEF DESCRIPTION OF THE DRAWINGS

To illustrate the technical solutions of embodiments of the present invention or in the prior art more clearly, the accompanying drawings needed for describing the embodiments or the prior art will be described below briefly. Apparently, the accompanying drawings described in the following are only several embodiments of the present invention, and persons of ordinary skill in the art can obtain other drawings according to these accompanying drawings without creative efforts.

FIG. 5-1 is a structural schematic of an exhausting pipe of the vacuum plate according to an embodiment of the present invention;

FIG. 5-2 is a structural schematic of an exhausting pipe of the vacuum plate according to another embodiment of the present invention;

DETAILED DESCRIPTION

In order to make the objective, technical solutions and advantages of embodiments of the present invention more clear, the technical solutions of the embodiments of the present invention will be described more clearly and completely in combination with the accompanying drawings of the embodiments of the present invention. Obviously, the embodiments only describe several, but not all, implementing modes of the present invention. Based on the embodiments of the present invention, all other embodiments obtained by those skilled in the art without creative work are within the protection scope of the present invention.

Figure 1:
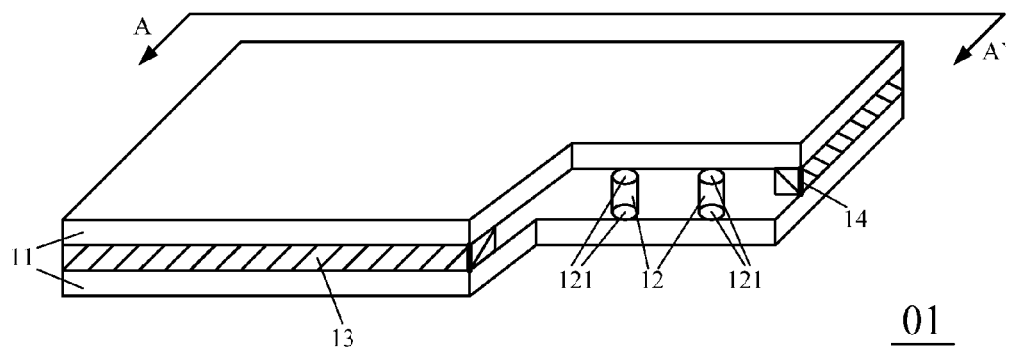
FIG. 1 is a structural schematic of the vacuum plate according to an embodiment of the present invention.
Figure 2:
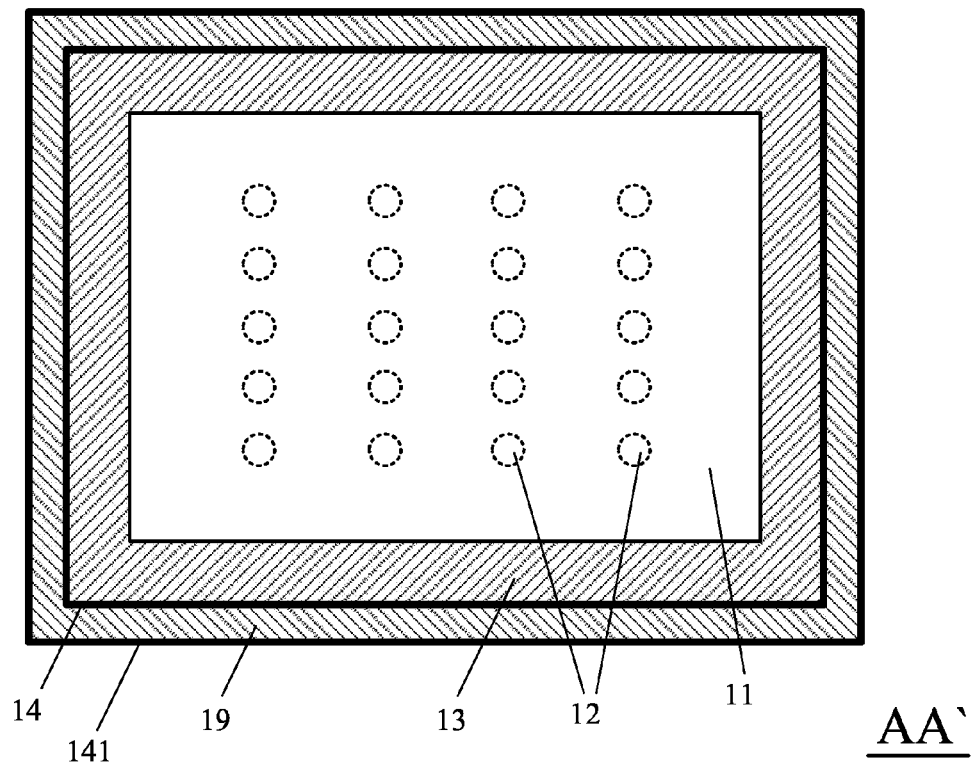
FIG. 2 is a top view of AA' surface of the vacuum plate according to an embodiment of the present invention.

FIG. 1 is a structural schematic of the vacuum plate according to an embodiment of the present invention; and FIG. 2 is a top view of AA' surface of the vacuum plate according to an embodiment of the present invention. As shown in FIGS. 1 and 2, the vacuum plate 01 of present embodiment comprises: at least two layers of plate 11, a plurality of support structures 12 with different heights, a sealing mixture 13, and an organic film 14.

Plates 11 in adjacent layers are separated by a plurality of support structures 12 with different heights, and the peripheries of the at least two layers of plate 11 are connected and closed via the sealing mixture 13. The peripheries of the at least two layers of plate 11 and the outside of the sealing mixture 13 are covered with the organic film 14.

According to surface undulation of plates 11 in two adjacent layers, the supporting structures 12 with corresponding height are arranged on corresponding positions of one plate 11; the sealing mixture 13 is provided at the periphery of said one plate 11; said one plate layer 11 is covered with another plate layer 11; and in this way an assembly of a two-layer or multi-layer vacuum plate 01 is formed by overlaying repeatedly. Specifically, in a vacuum oven with a vacuum level of $10^{-6}$ Pa to 10 Pa, the substrate of the sealing mixture 13 is melted at a temperature of equal to or less than 700° C., to form the assembly. After completion of sealing, the assembly is taken out and the organic film 14 is covered on the peripheries of the plates 11 and the outside of the sealing mixture 13, and thus the vacuum plate 01 is manufactured.

Wherein, the organic film 14 isolates the sealing mixture 13 from the atmosphere, and is able to avoid moisture and contaminants in the air corroding the sealing mixture 13.

In this embodiment, the material, size, and shape of different layers of plate 11 can be the same or different. For example, the material of the plate 11 can be non-toughened glass, or toughened glass, or semi-toughened glass, or low emissivity glass, or chemically strengthened glass, or heat-reflecting glass, or wired glass, or patterned glass, or hot-melt glass, or coated glass, or color glazed glass, or frosted glass, or carved glass, or chemically etched glass, or solar glass, or fire-resistant glass, or soda-lime glass, or borosilicate glass, or aluminum silicate glass, or silica glass, or microcrystalline glass, or ceramic glass, or organic glass, or porcelain plate, or metal plate, or solar cell panel, or plastic plate, or resin plate, or PE plate, or PC plate, or PMMA plate, or PET plate, or polyimide plate, or composite board, or a combination thereof. Various metal films, or various nonmetal films, or various oxide films, or various nitride films, or any combination of at least two or more of the above materials may be coated on the surface of the plate.

For the vacuum plate provided in an embodiment of the present invention, according to surface undulation of the plate, the supporting structures 12 with corresponding height are arranged at corresponding positions between the plates, where the heights of the support structures match with the spacings at corresponding positions between the plates, so that each support structure is clamped by the upper and the lower plate layers, and effectively plays a supporting role, thereby reducing the security risk from damage of the vacuum plate.

Moreover, the spacing between two adjacent support structures can be in a range of 10 mm to 120 mm.

The support structure 12 may be a columnar, a globular, a semi-globular, or a ring structure with a height of 0.1 mm to 5 mm and a diameter of 0.1 mm to 5 mm, may be a C-shaped split ring structure with a diameter of 1 mm to 10 mm formed by bending a metal wire with a diameter of 0.1 mm to 5 mm, may be a metal wire segment or a net structure with a diameter of 0.1 mm to 5 mm, or may be a linear structure or a columnar structure with a diameter of 0.1 mm to 5 mm formed by embossing or corrosion on the at least two plate layers. Therein, when the linear support structure 12 is formed by embossing or corrosion on the plates in a upper layer and a lower layer, it is preferred that the lines are arranged crosswise to each other to form contact support, so as to avoid the step of separately arranging the support structures 12, and to save cost.

In addition, the cross-section of the support structure 12, perpendicular to the plate 11 may be columnar, or T-shaped, or ⊥-shaped, or X-shaped, or +-shaped, or +-shaped, or ±-shaped, or ∓-shaped, or may be circular, or elliptical, or semicircular, or ring. The cross-section of the support structures 12, parallel to the plate 11, may be of any shape.

The material of the support structure 12 may be glass, or ceramic, or metal, or getter metal, or crystal, or plastic, or resin, or organic glass, or a combination of any two or more of the above materials.

The support structures 12 are fixedly connected to an adjacent plate 11 via an inorganic high temperature glue 121 provided on a surface of the support structures 12. The support structures 12 are fixed on proper positions by the inorganic high temperature glue 121, to avoid a potential risk of the support structures 12 moving due to erection or vibration of the vacuum plate.

Therein, the inorganic high temperature glue 121 may be a glass with a melt sealing temperature of equal to or less than 700° C., or a ceramic with a melt sealing temperature of equal to or less than 700° C., or a metal with a melting point of equal to or less than 700° C., or a soft metal with a Mohs Hardness of less than 4, or an inorganic adhesive, or an inorganic salt, or any combination of at least two or more of the above materials.

Moreover, as shown in FIG. 2, a frame 141 may be provided outside the peripheries of the at least two-layer of plate 11, and a filler 19 is provided between the at least two layers of plate 11 and the frame 141, so as to enhance the strength of the vacuum plate 01.

Therein, the material of the frame 141 may be plastic, or metal, or wood, or glass fiber reinforced plastics, or a combination thereof. The material of the filler 19 may be grease, or silica gel, or silicone adhesive, or rubber, or plastic, or resin, or cement, or a combination thereof.

For example, a steel frame is provided outside the periphery of the vacuum plate, and expansive cement is provided between the vacuum plate and the steel frame, so as to enhance the strength of the vacuum plate.

Figure 3:
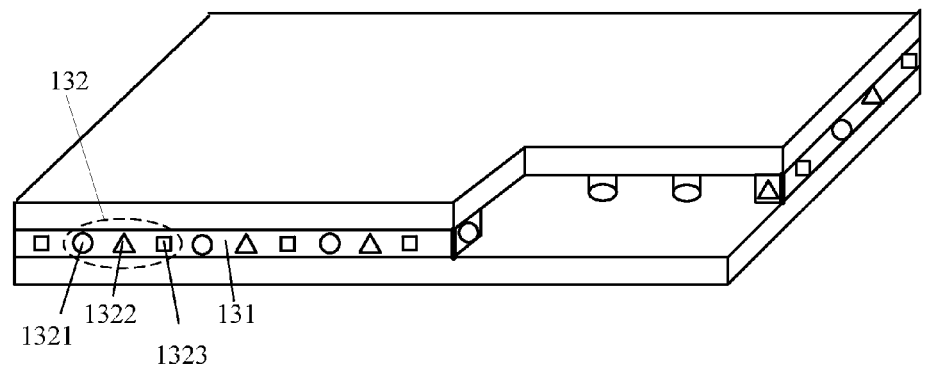
FIG. 3 is a structural schematic of a sealing mixture of the vacuum plate according to an embodiment of the present invention.

FIG. 3 is a structural schematic of a sealing mixture of the vacuum plate according to an embodiment of the present invention. As shown in FIG. 3, the sealing mixture 13 is formed by mixing a substrate 131 and particles 132. Therein, the substrate 131 may be a glass with a melt sealing temperature of equal to or less than 700° C., or a metal with a melting point of equal to or less than 700° C., or a ceramic with a melt sealing temperature of equal to or less than 700° C., or a plastic with a melt sealing temperature of equal to or less than 700° C., or a resin with a melt sealing temperature of equal to or less than 700° C., or a glue with a melt sealing temperature of equal to or less than 700° C., or any combination of at least two or more of the above materials.

The particles 132 may include: positioning particles 1321, expansive particles 1322, and viscous particles 1323.

The positioning particles 1321 may be 0.01% to 30% by volume of the sealing mixture 13, the expansive particles 1322 may be 0.01% to 70% by volume of the sealing mixture 13, and the viscous particles 1323 may be 0.01% to 50% by volume of the sealing mixture 13. The total volume percentage of these three particles is equal to or less than 75%.

Therein, the diameter of the positioning particles 1321 is equal to or less than the height of the support structures 12, and the softening temperature of the positioning particles 1321 is above 300° C. During the high temperature sealing of the vacuum plate 01, the substrate 131 of the sealing mixture 13 melts, and the spacing between the plates 11 in the upper and the lower layers at the periphery area thereof is easy to become too small under an external force, and the periphery areas of the upper and lower plates 11 even become in complete contact, causing a too large structure stress. In this embodiment, the positioning particles 1321 play a supporting role, ensuring that the spacing between plates 11 in the upper and the lower layers is no less than the diameter of the positioning particles 1321 at the periphery area thereof, and thus avoiding the above mentioned potential risk.

The expansive particles 1322 have a diameter of equal to or less than the height of the support structures 12, a softening temperature of above 300° C., and a expansion coefficient of $(-200\sim 70)\times 10^{-7}/°$ C. It is difficult to completely match the expansion coefficient of the substrate 131 of the sealing mixture 13 with that of plates 11 in the upper and the lower layers, and thus it is easy for residual stress to occur after sealing, which may cause cracking. The expansive particles 1322 are able to adjust the expansive coefficient of the sealing mixture 13 to match with the expansive coefficient of the upper and the lower layers of the plate 11, thus avoiding the potential risk.

The viscous particles 1323 have a diameter of equal to or less than the height of the support structure 12, a softening temperature of above 300° C., and an infiltration angle of less than 90° with respect to the substrate 131 of the sealing mixture 13. During the high temperature sealing of the vacuum plate, the substrate 131 of the sealing mixture 13, after being melted, tends to flow away from the sealing position, which may lead to a sealing failure. After the addition of the viscous particles 1323, the melted substrate 131 of the sealing mixture 13 attaches to the surrounding of the unmelted solid viscous particles 1323, and no longer flows around, thus effectively avoiding sealing failure.

Figure 4:
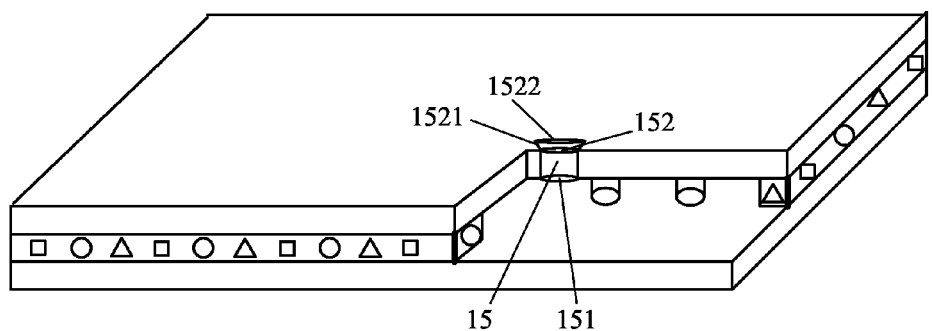
FIG. 4 is a structural schematic of an exhausting port of the vacuum plate according to an embodiment of the present invention.

FIG. 4 is a structural schematic of an exhausting port of the vacuum plate according to an embodiment of the present invention. As shown in FIG. 4, the exhausting port 15 may be arranged on an upper surface of at least one of the layers of plate 11, and has an open-end 151 located in the vacuum cavity formed between at least two layers of plate 11, and a closed-end 152 located outside of the vacuum cavity. Besides, a cover flap 1521 is provided on the closed-end 152 of the exhausting port 15, and a protecting lid 1522 is provided on the cover flap 1521.

Figures 1, 5:
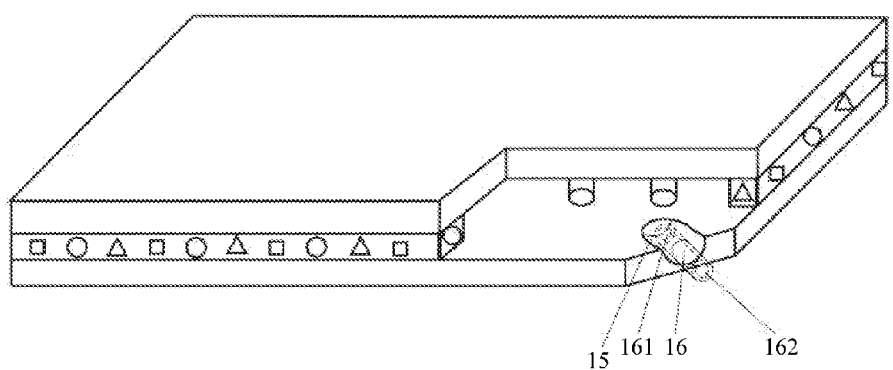
Figures 2, 5:
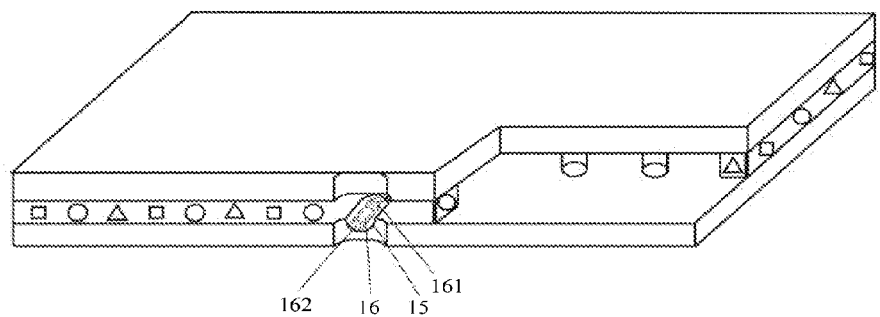

FIG. 5-1 is a structural schematic of an exhausting pipe of the vacuum plate according to an embodiment of the present invention; and FIG. 5-2 is a structural schematic of an exhausting pipe of the vacuum plate according to another embodiment of the present invention. The exhausting port 15 may be arranged on a side of plate 11 in at least one layer. The exhausting pipe 16 may be arranged inside of the exhausting port 15 on a side of plate 11 in at least one layer. The exhausting pipe 16 has an open-end 161 located in the vacuum cavity formed between at least two layers of plate 11, and a closed-end 162 located outside of the vacuum cavity. The exhausting port 15 may be located in a corner of the plate 11, or in an edge of the plate 11, and sealedly connected with the exhausting pipe 16 via the sealing mixture 13. If the exhausting pipe 16 is located in a corner, as shown in FIG. 5-1, a portion of the corner needs to be cut, so that the closed-end 162 of the exhausting pipe 16 is hidden inside of the straight edge of the vacuum plate 01. If the exhausting pipe 16 is located in an edge, as shown in FIG. 5-2, a portion of the plate surrounding the exhausting port 15 sinks inwards, so that the closed-end 162 of the exhausting pipe is hidden inside of the straight edge of the vacuum plate 01.

Figure 6:
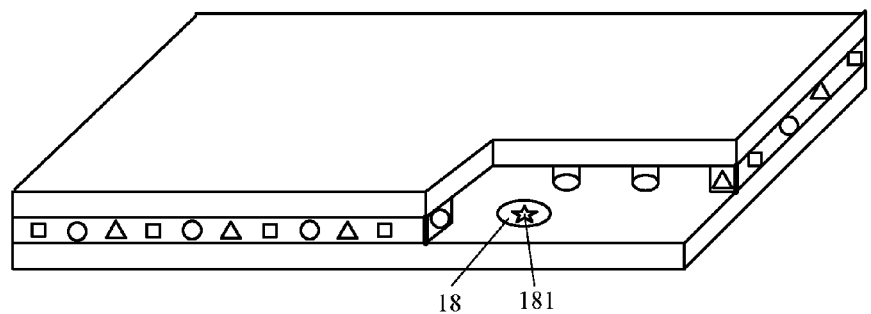
FIG. 6 is a structural schematic of a getter groove of the vacuum plate according to an embodiment of the present invention.

FIG. 6 is a structural schematic of a getter groove of the vacuum plate according to an embodiment of the present invention. As shown in FIG. 6, the getter groove 18 may also be arranged on at least one plate 11, and is filled with a getter 181. Preferably, the getter groove is in the shape of a bowl, a dish, or a ring.

The getter may be selected from evaporable getter, or non-evaporable getter. If an evaporable getter is adopted, after sealing the vacuum plate 01, high frequency evapotranspiration of the getter is conducted to activate the component of the getter, so as to absorb a small amount of gas released from interior of the vacuum plate 01 during use.

If the getter 181 is a non-evaporable getter, the component of the getter needs to be activated before the manufacture of the vacuum plate 01 is finished, so as to absorb a small amount of gas released from interior of the vacuum plate 01 during use.

If the getter 181 is sealed, after sealing of the vacuum plate 01, a laser is needed to cut an aperture in an outer wall of the getter 181, such that the activated component of the getter 181 may pass through this aperture, to absorb a small amount of gas released from interior of the vacuum plate 01 during use.

Figure 7:
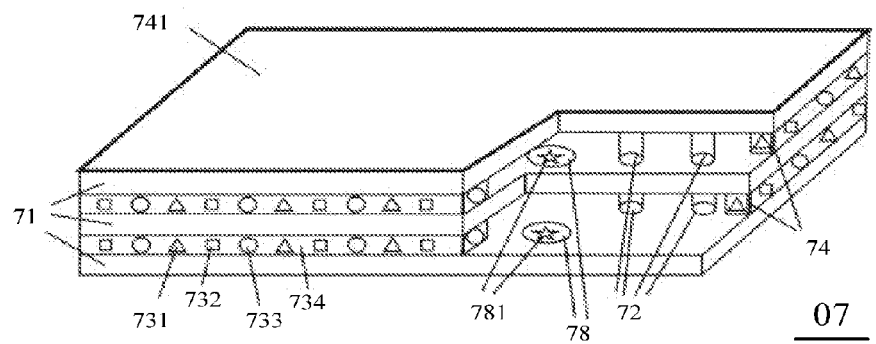
FIG. 7 is a structural schematic of a toughened vacuum glass plate according to an embodiment of the present invention.

FIG. 7 is a structural schematic of a toughened vacuum glass plate according to an embodiment of the present invention. As shown in FIG. 7, as a variant of the structure of the embodiment shown in FIG. 1, the plate 11 is a toughened glass plate 71, the support structures 12 are stainless steel support pillars 72, and the organic film 14 is grease 74. According to surface undulation of the toughened glass plate 71, the supporting structures 72 that have a height corresponding to the surface undulation and contain an inorganic high temperature glue are arranged uniformly on corresponding positions of the rectangular toughened glass plate 71 with a thickness of 5 mm. The inorganic high temperature glue is a Sn—Bi alloy with a melting point of 280° C., the support structures are stainless steel support pillars 72 with a diameter of 0.2 mm and a height of 0.2 mm to 0.8 mm having the Sn—Bi alloy on their surfaces. The interval between two adjacent support pillars is 30 mm.

The sealing mixture consisting of a substrate and 5% positioning particles, 30% expansive particles, and 15% viscous particles is provided on rims of the toughened glass plate 71. The positioning particles are Kovar alloy balls 733 with a diameter of 0.1 mm. In the prior art, during the high temperature sealing of the toughened glass plate 71, the substrate 734 melts, and the spacing between the upper and the lower toughened glass plates 71 at periphery area thereof is easy to become too small under an external force, and even becomes in complete contact at the periphery area, leading to a too large structure stress. The Kovar alloy balls in this embodiment play a supporting role, so that the spacing between the upper and the lower toughened glass plates 71 is no less than the diameter of the Kovar alloy balls at the periphery area, and thus avoiding the potential risk.

The expansive particles are ceramic powders 731 with a diameter of less than 0.12 mm and an expansion coefficient of $70 \times 10^{-7}/V$. It is difficult to completely match the expansion coefficient of the substrate 734 with that of the upper and the lower toughened glass plates 71, and thus it is easy for residual stress to occur after sealing, which may cause cracking. The ceramic powders 731 may adjust the expansive coefficient of the sealing mixture to match with the expansive coefficient of the upper and lower toughened glass plates 71, thus avoiding the potential risk.

The viscous particles are silver powders 732 with a diameter of less than 0.18 mm. In the prior art, during the high temperature sealing of the toughened glass plate 71, the substrate 734 after being melted tends to flow around and away from the sealing position, which may lead to a sealing failure. After the addition of the silver powders 732, the melted substrate 734 attaches to the surrounding of the unmelted solid viscous particles 732, and no longer flows around, thus effectively avoiding the sealing failure.

The substrate is Sn—Bi alloy 734 with a melting point of 280° C.

An air-tight sealed stainless steel cup with a diameter of 4 mm and a height of 1 mm containing activated non-evaporable zirconium getter 781 is arranged in a getter groove 78. Another toughened glass plate 71 with a thickness of 5 mm, which has the same size as the former toughened glass plate 71, is covered on the former toughened glass plate 71.

According to the above method, three toughened glass plates 71 may form a three-layer assembly. Specifically, in a vacuum oven with a vacuum level of $10^{-4}$ Pa, the substrate of the sealing mixture is melted by holding for 5 minutes at 280° C., and thus the three toughened glass plates 71 are air-tightly sealed together to form an assembly. After completion of sealing, the assembly is taken out and the grease 74 is covered on the outside of the sealing mixture.

An aperture is punched on the top of the stainless steel cup via a laser so that the active zirconium powders in the non-evaporable zirconium getter 781 may communicate with the space between two adjacent toughened glass plates 71, to directly absorb the residual gas in the vacuum toughened glass plate 71.

Therein, the vacuum layers between the toughened glass plates 71 may or may not communicate with each other. If the vacuum layers communicate with each other, there are apertures between the vacuum layers. If the vacuum layers do not communicate with each other, even one vacuum layer fails, the other vacuum layers still have excellent heat insulation effect.

The outer surface of the vacuum plate may be covered or pasted with a functional film. The functional film may be grease, or explosion-proof film, or shading film, or light adjusting film, or light filtering film, or anti-reflection film, or Low-E film, or antifouling film, or antifogging film, or fungi-proofing film, or self-cleaning film, or hydrophilic film, or hydrophobic film, or conducting film, or electromagnetic shielding film, or antenna film, or special circuit film, or touch film, or LED displaying film, or LCD displaying film, or OLED displaying film, or solar film, or color crystal film, or PET film, or PBT film, or PVC film, or polyimide film, or UV film, or coating film, or painting film, or ink film and the like, or a combination thereof.

The functional film on the outer surface of the vacuum plate endows it with a special function. For example, the explosion-proof film may enhance impact resistance of the vacuum plate, and prevent the fragments falling off, if the vacuum plate is broken; the shading film may block light; the light adjusting film may adjust the amount of transmitted light; the antifouling film may reduce the possibility of being contaminated; the antifogging film may prevent from fogging; the fungi-proofing film may prevent bacteria growing; the self-cleaning film may be cleaned by itself; the hydrophilic film may accelerate falling off of rainwater; the conducting film may conduct electricity; the electromagnetic shielding film may shield an electromagnetic wave; the antenna film may receive a signal; the special circuit film may have a circuit function; the touch film may have a touch-control function; the LED displaying film may display LED image; the LCD displaying film may display LCD image; the OLED displaying film may display OLED image; the solar film may convert the sunshine to electric energy or heat energy; and the color crystal film may increase the beauty.

An explosion proof film 741 is covered on the outer surface of the vacuum toughened glass plate 71.

Figure 8:
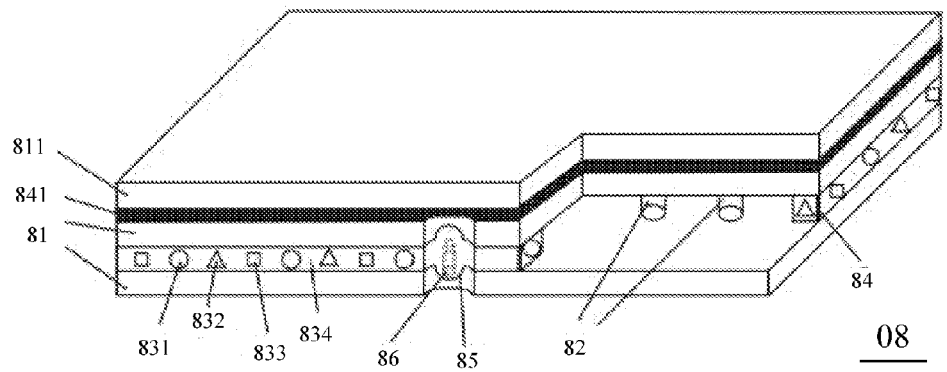
FIG. 8 is a structural schematic of a laminated plate according to an embodiment of the present invention.

FIG. 8 is a structural schematic of a laminated plate according to an embodiment of the present invention. The laminated plate may be formed by bonding the vacuum plate and other plate set on an outer surface of the vacuum plate via an adhesive layer, such as, non-toughened glass, or toughened glass, or semi-toughened glass, or low emissivity glass, or chemically strengthened glass, or heat-reflecting glass, or wired glass, or patterned glass, or hot-melt glass, or coated glass, or color glazed glass, or frosted glass, or carved glass, or chemically etched glass, or solar glass, or fire-resistant glass, or soda-lime glass, or borosilicate glass, or aluminum silicate glass, or silica glass, or microcrystalline glass, or ceramic glass, or organic glass, or porcelain plate, or metal plate, or solar cell panel, or plastic plate, or resin plate, or PE plate, or PC plate, or PMMA plate, or PET plate, or polyimide plate, or composite board. The adhesive layer may be transparent film, or non-transparent film, or color film, or electrochromic light adjusting film, or thermochromic light adjusting film, or photochromic light adjusting film, or light filtering film, or Low-E film, or electromagnetic shielding film, or conducting film, or antenna film, or special circuit film, or touch film, or LED displaying film, or LCD displaying film, or OLED displaying film, or solar film, or PVB film, or SGP film, or EVA film, or PU film, or PMMA film, or UV film, or a combination thereof.

The laminated plate formed on the surface of the vacuum plate not only enhances the strength of the vacuum plate, but also endows the vacuum plate with the properties of the adhesive layer and the laminated plate, such as the following propertis: transparent, or non-transparent, or colorful, or electrochromic, or thermochromic, or photochromic, or electromagnetic shielding, or conducting, as receiver antenna, as special circuit, or touch-control, or LED displaying, or LCD displaying, or OLED displaying, or solar power generation.

As shown in FIG. 8, as another variant of the structure of the embodiment shown in FIG. 1, the plate 11 is semi-toughened glass plate 81, the support structures 12 are glass support pillars 82, and the organic film 14 is silicone oil 84. One side edge of the rectangular semi-toughened glass plate 81 with a thickness of 8 mm is concaved inwards, to form an arc with a diameter of 10 mm. A semi-circular exhausting port 85 with a depth of 3 mm and a length of 15 mm is formed on the top surface of the concaved portion by chemically etching. The semi-toughened glass plate 81 is chemically etched to form a plurality of cylindrical support pillars with a diameter of 0.2 mm and a height of 0.2 mm, and the interval between adjacent support pillars is 50 mm. According to the interval between the semi-toughened glass plates 81, the glass support pillars 82 with corresponding height are attached to each support pillar.

The sealing mixture consisting of a substrate and 6% positioning particles, 10% expansive particles, and 6% viscous particles is provided on rims of the semi-toughened glass plate 81, wherein the positioning particles are forsterite ceramic balls 831 with a diameter of 0.15 mm, the expansive particles are glass powders 832 with a diameter of less than 0.15 mm and an expansion coefficient of $65 \times 10^{-7}/°$ C., the viscous particles are titanium oxide powders 833 with a diameter of less than 0.16 mm, and the substrate is glass 834 with a melting point of 380° C.

An exhausting pipe 86 with a diameter of 5 mm and a length of 30 mm coated with the sealing mixture is placed into the semi-circular exhausting port 85.

Another semi-toughened glass plate 81 with a thickness of 8 mm, which has the same shape as the former semi-toughened glass plate 81, is covered on the former semi-toughened glass plate 81. The substrate of the sealing mixture is melted by holding for 5 minutes at 380° C., and thus the two semi-toughened glass plates 81 are air-tightly sealed together.

The space between the two semi-toughened glass plates 81 is vacuumized through the exhausting pipe 86 until the vacuum level becomes $10^{-3}$ Pa. Then the closed-end of the exhausting pipe 86 is sealed. The closed-end portion of the exhausting pipe 86 extents into the concaved portion by 3 mm, and just is hidden in the straight edge connection line of adjacent semi-toughened glass plates 81.

The silicone oil 84 is coated onto the outside of the sealing mixture, and then the vacuum semi-toughened glass plate is formed.

The vacuum semi-toughened glass plate in combination with an electrochromic light adjusting film 841 and a Low-E toughened glass 811 forms a laminated plate 08.

Figure 9:
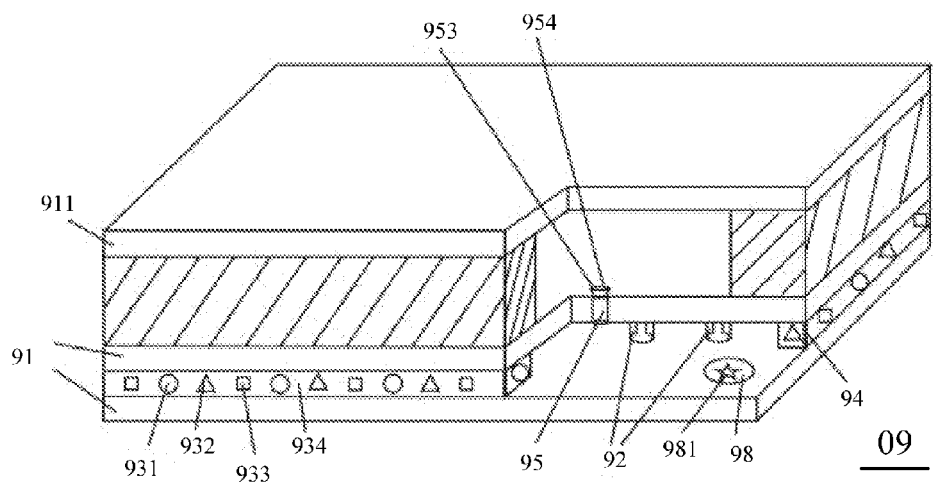
FIG. 9 is a structural schematic of a hollow plate according to an embodiment of the present invention.

FIG. 9 is a structural schematic of a hollow plate according to an embodiment of the present invention. The hollow plate may be formed by the vacuum plate and other plate set on an outer surface of the vacuum plate, such as non-toughened glass, or toughened glass, or semi-toughened glass, or low emissivity glass, or chemically strengthened glass, or heat-reflecting glass, or wired glass, or patterned glass, or hot-melt glass, or coated glass, or color glazed glass, or frosted glass, or carved glass, or chemically etched glass, or solar glass, or fire-resistant glass, or soda-lime glass, or borosilicate glass, or aluminum silicate glass, or silica glass, or microcrystalline glass, or ceramic glass, or organic glass, or porcelain plate, or metal plate, or solar cell panel, or plastic plate, or resin plate, or PE plate, or PC plate, or PMMA plate, or PET plate, or polyimide plate, or composite board. A gas, such as, argon, or an aerosol may be filled into a hollow layer between the vacuum plate and the other plate. The hollow layer may be provided with a venetian blind or other curtain. The curtain has a transmission mechanism provided in the hollow layer and a control mechanism provided out of the hollow layer. The control mechanism is connected to the transmission mechanism via mechanical or magnetic connection to control the transmission mechanism. The hollow plate formed on the surface of the vacuum plate enables the thickness of the vacuum plate to match with different frames, and has corresponding function of the hollow plate.

As shown in FIG. 9, as a further variant of the structure of the embodiment shown in FIG. 1, the plate 11 is a glass plate 91, the support structures 12 are C-shaped rings 92, and the organic film 14 is silica gel 94. According to surface undulation of the glass plate 91, the supporting structures with corresponding heights and containing an inorganic high temperature glue, are arranged uniformly on corresponding positions of the rectangular glass plate 91 with a thickness of 3 mm, wherein the inorganic high temperature glue is a glass with a melting point of 420° C., the support structures are C-shaped rings 92 with a diameter of 2 mm formed by bending stainless steel wires with a diameter of 0.2 mm to 1.0 mm, and the interval between two support adjacent structures is 20 mm.

The sealing mixture consisting of a substrate and 5% positioning particles, 20% expansive particles and 10% viscous particles is provided on rims of the glass plate 91, wherein the positioning particles are forsterite ceramic balls 931 with a diameter of 0.1 mm, the expansive particles are glass powders 932 with a diameter of less than 0.11 mm and an expansion coefficient of $65 \times 10^{-7}/°$ C., the viscous particles are titanium oxide powders 933 with a diameter of less than 0.15 mm, and the substrate is glass 934 with a melting point of 400° C.

An exhausting port 95 is a through-hole with a diameter of 3 mm, which has a spacing of 30 mm from both sides of the glass plate 91. A metal cover flap 953 comprising the sealing mixture is provided outside the exhausting port 95. An evaporable barium aluminum nickel getter 981 is filled in a getter groove 98 on the glass plate 91.

Another integral glass plate 91 with a thickness of 3 mm is covered on the former glass plate 91. The substrate of the sealing mixture is melted by holding for 10 minutes at 420° C., and thus the two glass plates 91 are air-tightly sealed together.

The space between the two glass plates 91 is vacuumized through the exhausting port 95 until the vacuum level becomes $10^{-2}$ Pa.

The metal cover flap 953 is heated to 420° C., to melt the substrate of the sealing mixture thereon and thus air-tightly seal the exhausting port 95. A protecting cover 954 is bonded onto the glass plate 91 using a glue.

The evaporable barium aluminum nickel getter 981 may form an active barium film on an internal surface of the vacuumized space, to absorb the residual gas between the two glass plates 91.

The silica gel 94 is coated onto the outside of the sealing mixture, and then the vacuum glass plate is formed.

A hollow plate 09 may be formed by the vacuum glass plate and a solar glass plate 911 set on an out surface of the vacuum glass plate with the metal cover flap 953.

Figure 10:
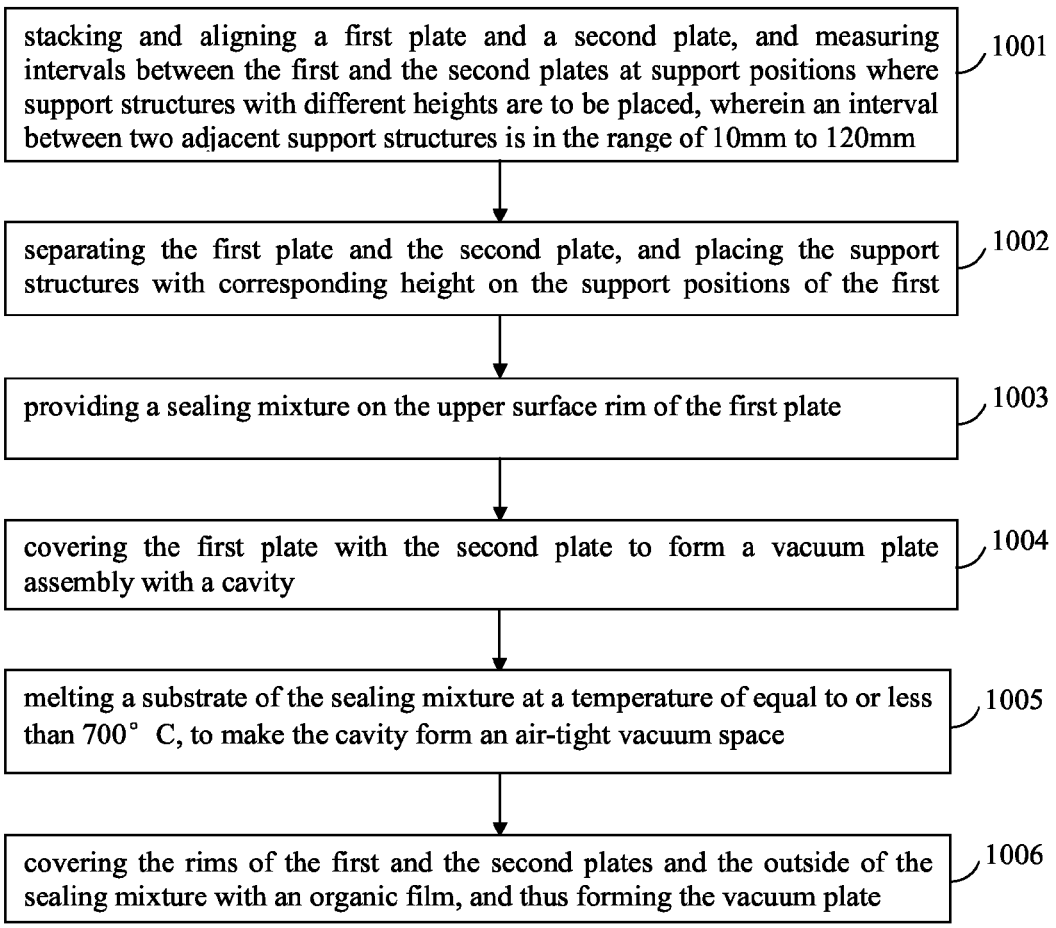
FIG. 10 is a flow chart of a method for manufacturing the vacuum plate according to an embodiment of the present invention.

FIG. 10 is a flow chart of a method for manufacturing the vacuum plate according to an embodiment of the present invention. As shown in FIG. 10, the method for manufacturing the vacuum plate in this embodiment comprises:

Step 1001, aligning and stacking a first plate and a second plate, and measuring intervals between the first and the second plates at positions where support structures are to be placed, wherein the interval between two adjacent support structures is 10 mm to 120 mm.

Step 1002, separating the first and the second plates, and placing the support structures with corresponding height on the above positions of the first plate.

Step 1003, providing a sealing mixture on the upper surface rim of the first plate.

Step 1004, covering the first plate with the second plate to form a vacuum plate assembly with a cavity.

Step 1005, melting the substrate of the sealing mixture at a temperature of equal to or less than 700° C., to make the cavity form a sealed vacuum space.

For the step 1005, the sealed vacuum space may be formed by melting the substrate of the sealing mixture at a temperature of equal to or less than 700° C. in a vacuum oven with a vacuum level of $10^{-6}$ Pa to 10 Pa. It also may be formed by the following steps: placing the vacuum plate assembly into a heating oven and heating it at a temperature of equal to or less than 700° C. to melt the substrate of the sealing mixture, then vacuumizing the cavity between the two plates through an exhausting port until the vacuum level is in the range of $10^{-6}$ Pa to 10 Pa, and finally, sealing the exhausting port.

Step 1006, covering rims of the first and the second plates and the outside of the sealing mixture with an organic film and thus forming the vacuum plate.

It should be noted that this embodiment only exemplarily illustrates a method for manufacturing the vacuum plate with two layers of plate. However, the vacuum plate of the present invention is not limited to two layers of plate, and may also be manufactured by more than two layers of plate. The manufacture principle of the vacuum plate with more than two layers of plate is similar to the process of this embodiment, and thus will not be described in detail here.

In the method for manufacturing the vacuum plate according to embodiments of the present invention, according to surface undulation of the plate, the supporting structures with corresponding heights are arranged on corresponding positions between the layers of plate, and the heights of the support structures match with the spacings of corresponding positions within the vacuum plate so that each support structure can be clamped by the upper and the lower plates, and effectively plays a supporting role, thereby reducing the security risk from damage of the vacuum plate.

Finally, it should be appreciated that the above embodiments are merely provided for describing technical solutions of the present invention, but not intend to limit the present invention. Although the present invention has been described in detail with reference to the foregoing embodiments, it should be understood by those of ordinary skill in the art that modifications may be made to the technical solutions described in the foregoing embodiments, or equivalent replacements can be made to some or all technical features in the technical solutions; such modifications or replacements do not make the essence of corresponding technical solutions depart from the scope of the present invention.

What is claimed is:

1. A vacuum plate comprising:
    at least two layers of plate comprising a first layer having an undulated first surface and a second layer having an undulated second surface, the first surface facing the second surface;
    a plurality of support structures with different heights each in contact with the first and second surfaces, the support structures selectively positioned at corresponding positions based on measured spacing between the first layer and the second layer at the corresponding positions such that the heights of the support structures match the measured spacing at the corresponding positions; and
    an organic film,
    wherein
        peripheries of the at least two layers of plate are connected and sealed via a sealing mixture; and
        the peripheries of the at least two layers of plate and outside of the sealing mixture are covered with the organic film.

2. The vacuum plate according to claim 1, characterized in that:
    an interval between two adjacent support structures is in the range of 10 mm to 120 mm.

3. The vacuum plate according to claim 1, characterized in that:
    the support structures are of a columnar, or a globular, or a semi-globular, or a ring structure with a height of 0.1 mm to 5 mm and a diameter of 0.1 mm to 5 mm; or
    a C-shaped split ring structure with a diameter of 1 mm to 10 mm formed by bending a metal wire with a diameter of 0.1 mm to 5 mm, or a metal wire segment or a net structure with a diameter of 0.1 mm to 5 mm; or
    a linear structure or a columnar structure with a diameter of 0.1 mm to 5 mm formed by embossing or corrosion on the at least two layers of plate.

4. The vacuum plate according to claim 3, characterized in that: a surface of the support structures is fixedly connected to the plate of an adjacent layer via an inorganic glue; and
    the inorganic glue is a glass with a melt sealing temperature of equal to or less than 700° C., or a ceramic with a melt sealing temperature of equal to or less than 700° C., or a metal with a melting point of equal to or less than 700° C., or a soft metal with a Mohs hardness of less than 4, or an inorganic adhesive, or an inorganic salt, or a combination of at least two or more of the above materials.

5. The vacuum plate according to claim 1, characterized in that:
    material of the support structures is a glass, or a ceramic, or a metal, or a getter metal, or a crystal, or a plastic, or a resin, or an organic glass, or a combination of at least two or more of the above materials.

6. The vacuum plate according to claim 1, characterized in that:
    the sealing mixture includes a mixture of a substrate and particles;
    the substrate is a glass with a melt sealing temperature of equal to or less than 700° C., or a metal with a melting point of equal to or less than 700° C., or a ceramic with a melt sealing temperature of equal to or less than 700° C., or a plastic with a melt sealing temperature of equal to or less than 700° C., or a resin with a melt sealing temperature of equal to or less than 700° C., or a glue with a melt sealing temperature of equal to or less than 700° C., or a combination of at least two or more of the above materials.

7. The vacuum plate according to claim 6, characterized in that:
  the particles include positioning particles, expansive particles, and viscous particles;
  the positioning particles are 0.01% to 30% of the sealing mixture by volume, the expansive particles are 0.01% to 70% of the sealing mixture by volume, the viscous particles are 0.01% to 50% of the sealing mixture by volume, and a total volume percentage of these three particles is equal to or less than 75%;
  the positioning particles have a diameter of equal to or less than the height of the support structures, and a softening temperature of above 300° C.;
  the viscous particles have a diameter of equal to or less than the height of the support structures, a softening temperature of above 300° C., and an infiltration angle of less than 90° with respect to the substrate of the sealing mixture;
  the expansive particles have a diameter of equal to or less than the height of the support structures, a softening temperature of above 300° C., and an expansion coefficient of $-200\times10^{-7}/°$ C. to $70\times10^{-7}/°$ C.

8. The vacuum plate according to claim 1, further comprising: an exhausting port, wherein the exhausting port is arranged on an upper surface or a side surface of the plate of at least one layer, and an open-end of the exhausting port is located in a vacuum cavity formed between the at least two layers of plate, and a closed-end of the exhausting port is located outside the vacuum cavity.

9. The vacuum plate according to claim 8, characterized in that:
  a cover flap is provided at the closed-end of the exhausting port, and a protecting lid is provided on the cover flap.

10. The vacuum plate according to claim 8, characterized by further comprising: an exhausting pipe, wherein the exhausting pipe is arranged inside of the exhausting port, an open-end of the exhausting pipe is located in the vacuum cavity formed between the at least two layers of plate, and a closed-end of the exhausting pipe is located outside the vacuum cavity.

11. The vacuum plate according to claim 1, characterized by further comprising: a getter groove, wherein the getter groove is arranged on the plate of at least one layer, and the getter groove is filled with a getter.

12. The vacuum plate according to claim 1, characterized in that:
  an outer surface of the vacuum plate is covered or pasted with a functional film.

13. The vacuum plate according to claim 1, further comprising: a frame, wherein the frame is provided outside the peripheries of the at least two layers of plate, and a filler is provided between the at least two layers of plate and the frame.

14. The vacuum plate according to claim 1, characterized in that:
  a laminated plate is formed on an outer surface of the vacuum plate via an adhesive.

15. The vacuum plate according to claim 1, characterized in that:
  a hollow layer is formed on an outer surface of the vacuum plate.

16. A method for manufacturing a vacuum plate of claim 1, comprising:
  stacking and aligning a first plate and a second plate, and measuring intervals between the first and the second plates at support positions where support structures are to be placed, wherein, an interval between two adjacent support structures is in the range of 10 mm to 120 mm;
  separating the first plate and the second plate, and placing the support structures with corresponding height on the support positions of the first plate;
  providing a sealing mixture at the upper surface rim of the first plate;
  covering the first plate with the second plate to form a vacuum plate assembly with a cavity;
  melting a substrate of the sealing mixture at a temperature of equal to or less than 700° C., to make the cavity form an air-tight vacuum space;
  covering rims of the first and the second plates and the outside of the sealing mixture with an organic film and thus forming the vacuum plate.

17. The method according to claim 16, wherein:
  said melting the substrate of the sealing mixture comprises:
  forming the air-tight vacuum space by melting the substrate of the sealing mixture in a vacuum oven with a vacuum level of $10^{-6}$ Pa to 10 Pa at a temperature of equal to or less than 700° C.

18. The method according to claim 16, wherein said melting the substrate of the sealing mixture comprises:
  placing the vacuum plate assembly into a heating oven and heating it at a temperature of equal to or less than 700° C., to melt the substrate of the sealing mixture, and vacuumizing the cavity through an exhausting port until the vacuum level is in the range of $10^{-6}$ Pa to 10 Pa, and then sealing the exhausting port.

* * * * *